US009253373B2

(12) United States Patent
Tico et al.

(10) Patent No.: US 9,253,373 B2
(45) Date of Patent: Feb. 2, 2016

(54) FLARE DETECTION AND MITIGATION IN PANORAMIC IMAGES

(75) Inventors: Marius Tico, Mountain View, CA (US); Paul M. Hubel, Mountain View, CA (US); Frank Doepke, San Jose, CA (US); Todd S. Sachs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 578 days.

(21) Appl. No.: 13/493,329

(22) Filed: Jun. 11, 2012

(65) Prior Publication Data

US 2013/0329132 A1 Dec. 12, 2013

Related U.S. Application Data

(60) Provisional application No. 61/656,443, filed on Jun. 6, 2012.

(51) Int. Cl.
*H04N 5/357* (2011.01)
*H04N 5/14* (2006.01)
*H04N 5/232* (2006.01)

(52) U.S. Cl.
CPC ............. *H04N 5/14* (2013.01); *H04N 5/23238* (2013.01); *H04N 5/357* (2013.01); *H04N 5/3572* (2013.01)

(58) Field of Classification Search
CPC .................. H04N 2013/0088; H04N 5/23238; H04N 5/3415; H04N 5/3692; H04N 3/1593; H04N 5/23232; H04N 5/247; G03B 27/00; G03B 2206/004; G03B 37/00; G03B 37/06; G03B 37/02; G03B 37/04; G02B 13/06; G03H 2001/0426; G06T 2200/32; G06T 3/4038; G06T 7/0024; B60R 2300/303; G06K 2009/2045; G08B 13/19628
See application file for complete search history.

(56) References Cited

U.S. PATENT DOCUMENTS 8,238,687 B1 * 8/2012 Lim et al. ...................... 382/274
2012/0263397 A1 * 10/2012 Kimura .......................... 382/284

* cited by examiner

*Primary Examiner* — Twyler Haskins
*Assistant Examiner* — Angel L Garces-Rivera
(74) *Attorney, Agent, or Firm* — Blank Rome LLP

(57) ABSTRACT

Lens flare mitigation techniques determine which pixels in images of a sequence of images are likely to be pixels affected by lens flare. Once the lens flare areas of the images are determined, unwanted lens flare effects may be mitigated by various approaches, including reducing border artifacts along a seam between successive images, discarding entire images of the sequence that contain lens flare areas, and using tone-mapping to reduce the visibility of lens flare.

17 Claims, 9 Drawing Sheets

FLARE DETECTION AND MITIGATION IN PANORAMIC IMAGES

CROSS-REFERENCE TO RELATED APPLICATION

This application claims priority to U.S. Provisional Patent Application Ser. No. 61/656,443, filed Jun. 6, 2012, which is hereby incorporated by reference in its entirety.

BACKGROUND

This disclosure relates generally to the field of digital imaging. More particularly, but not by way of limitation, it relates to techniques for detecting and mitigating lens flare effects in panoramic images.

Lens flare is the light scattered in lens systems through internal reflections in the lens. Flare is caused by a very bright light source (e.g., the sun) that is either in the image or shining at the lens from a certain angle. The aspect of flare in natural images is determined by the shape of the camera aperture and it is expected to have an almost regular shape, e.g., rings, circles, straight lines across the image, etc.

Panoramic images may be created by stitching together images or slices of images of a sequence of images captured by an imaging device. Typically, the imaging device is rotated on an axis, taking the sequence of images as the imaging device rotates. In some imaging devices, a sequence of narrow segments or slices, one from each of the captured images of the sequence of images is used to create the panoramic image, rather than the entire captured image, allowing a closer approximation a surface of a cylinder about the imaging device. The slices are then aligned and stitched together. The field of view of each slice overlaps the field of view of the preceding slice in the sequence. Rather than simply overlaying one slice on top of the other, the resulting panoramic image the overlap area is stitched along a seam so that a portion of the overlap area on one side of the seam is taken from the predecessor slice and a portion of the overlap area on the other side of the seam is taken from the successor slice. To avoid apparent motion artifacts, the seam is often not a straight line, but may be a complex curve across the overlapped area of a pair of slices.

Lens flare patterns change their location with the camera movement in accordance to the angle between the optical axis of the camera and the bright light source. Consequently, a set of images captured for creating a panoramic view of the scene may be affected by flare in different ways depending on the camera orientation when capturing each image. Stitching such images together may result in artifacts like unnatural jaggy flare borders 110 illustrated in the photograph reproduced in FIG. 1.

SUMMARY

Lens flare mitigation techniques determine which pixels in images of a sequence of images are likely to be pixels affected by lens flare. Once the lens flare areas of the images are determined, unwanted lens flare effects may be mitigated by various approaches, including reducing border artifacts along a seam between successive images, discarding entire images of the sequence that contain lens flare areas, and using tonemapping to reduce the visibility of lens flare.

A non-transitory program storage device is disclosed. The program storage device is readable by a programmable control device. Instructions are stored on the program storage device for causing the programmable control device to capture a sequence of images with a programmable imaging device; and reduce lens flare effects in the sequence of images. The instructions for reducing lens flare effects include instructions for causing the programmable control device to identify an overlap region between successive images of the sequence of images; detect lens flare regions in the overlap region; and reduce lens flare effects in the overlap region.

Another non-transitory program storage device is disclosed. The program storage device is readable by a programmable control device. Instructions are stored on the program storage device for causing the programmable control device to capture a sequence of images using an image sensor of a programmable device; identify an overlap region between successive images of the sequence of images and a seam between the successive images; calculate an average intensity gradient magnitude in a spatial region surrounding pixels in the overlap region that have a color associated with lens flare regions; calculate a probability that a pixel is a lens flare pixel based on the average intensity gradient magnitude; identify the pixel as a lens flare pixel if the probability that the pixel is a lens flare pixel exceeds a predetermined threshold probability value; determine a count of pixels of a row of pixels in the overlap region that are lens flare pixels; adjust the seam to be vertical across the row of pixels if the count exceeds a predetermined threshold count value; and generate a panoramic image from the sequence of images.

A programmable device is disclosed. The device includes an image sensor; a programmable control device; and a memory coupled to the programmable control device. Instructions are stored in the memory, the instructions causing the programmable control device to capture a sequence of images using the image sensor; mitigate lens flare effects in the sequence of images; and generate a panoramic image from the sequence of images. The instructions to mitigate lens flare effects in the sequence of images include instructions causing the programmable control device to identify an overlap region between successive images of the sequence of images; detect lens flare regions in the overlap region; and mitigate lens flare effects in the overlap region.

A method of mitigating lens flare effects in a sequence of images is disclosed. The method includes identifying an overlap region between successive images of the sequence of images; detecting a lens flare region in the overlap region; and reducing lens flare effects in the lens flare region.

Another programmable device is disclosed. The device includes an image sensor; a programmable control device; and a memory coupled to the programmable control device. Instructions are stored in the memory, the instructions causing the programmable control device to capture a sequence of images using the image sensor; mitigate lens flare effects in a lens flare region of a first image of the sequence of images overlapped by a second region of the sequence of images; and generate a composite image from the sequence of images.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although typically the slices used to construct a panoramic image are a narrow vertical segment of a complete image, one of skill in the art will understand that the slice may be of any desired portion of the image, including the entire image. Similarly, references to an image in the description below should be understood to refer to the slice of that image that is used for constructing the panoramic image, without regard to how much of the complete image is contained in the slice.

Lens flare mitigation techniques determine which pixels in images of a sequence of images are likely to be pixels affected by lens flare. Once the lens flare areas of the images are determined, unwanted lens flare effects may be mitigated by various approaches, including reducing border artifacts along a seam between successive images, discarding entire images of the sequence that contain lens flare areas, and using tone-mapping to reduce the visibility of lens flare.

Overview

Figure 3:
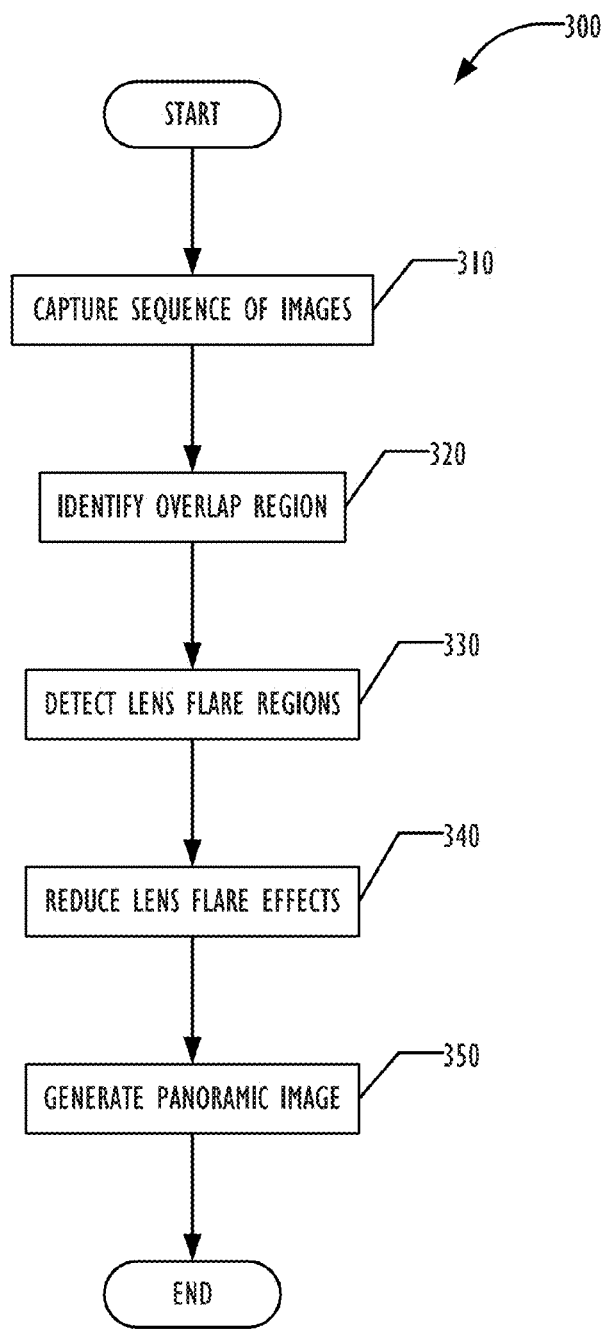
FIG. 3 is a flowchart illustrating a technique for generating a panoramic image with reduced lens flare effects.

FIG. 3 is a flowchart illustrating an overview of a technique 300 for generating a panoramic image that reduces the effects of lens flare. In block 310, a sequence of images is captured that are to be stitched together to form the panoramic image. Where only portions or slices of those images are to be used, those slices can be extracted from the original images. In block 320, overlap regions between successive images in the sequence of images may be detected, allowing for the determination of a seam between the successive images. Various techniques for detecting overlap regions and determining a seam through those overlap regions are known and may be used as desired. In block 330, the presence of lens flare may be detected, and regions of the image containing lens flare may be determined. Once the lens flare regions are detected, in block 340 the effects of lens flare may be reduced or eliminated. Finally, in block 350 the panoramic image may be generated by stitching the sequence of images together, using techniques known in the art. Various techniques for generating the panoramic image from the sequence of images are known and may be used as desired.

Detection of Lens Flare

Figure 4:
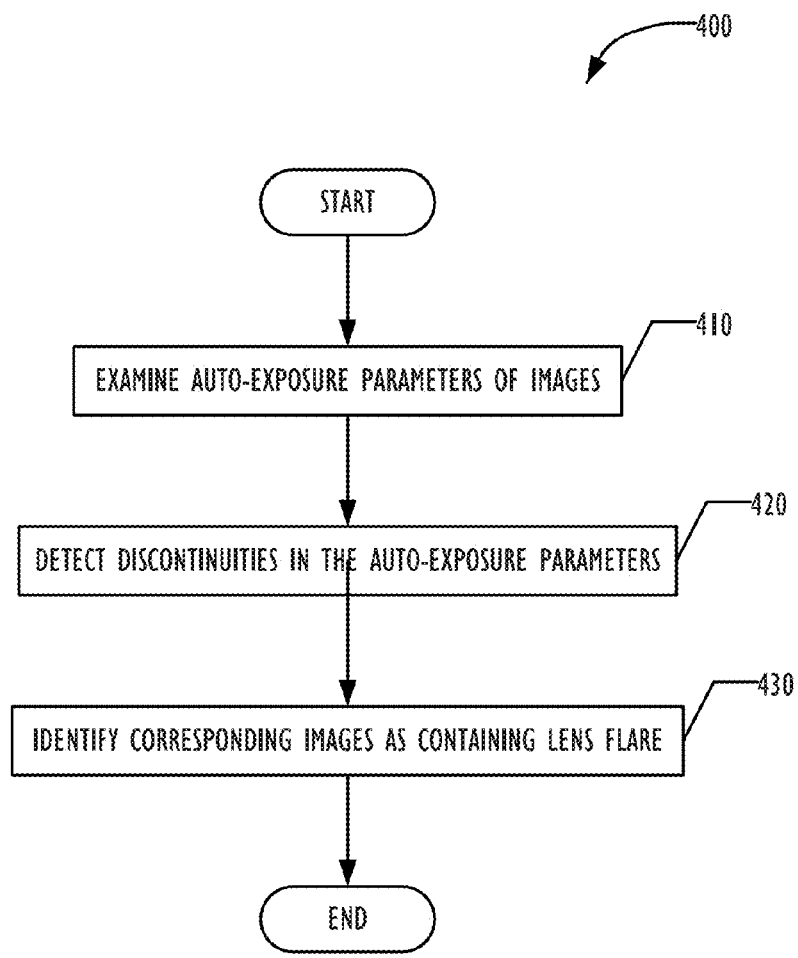
FIG. 4 is a flowchart illustrating a technique for detecting lens flare in a sequence of images.

FIG. 4 is a flowchart illustrating a technique 400 for detecting lens flare in a sequence of images. As a sequence of images taken by the same imaging device over a short period of time, the auto-exposure parameters of the imaging device typically exhibit a smooth, relatively continuous relationship with each other across the sequence of images. However, in an image with lens flare, the lens flare typically causes a spike or discontinuity in those auto-exposure parameters that can be recognized. In block 410, the auto-exposure parameters of the sequence of images may be examined, such as by plotting the auto-exposure parameters and examining the resultant auto-exposure curve or curves. In block 420 discontinuities in the auto-exposure parameters may be detected. Then in block 430 the images corresponding to the discontinuities in the auto-exposure parameters may be identified as image containing lens flare. More than one auto-exposure parameter, such as gain, may be considered when performing the technique 400.

Similar techniques may be used to identify images containing lens flare by detecting discontinuities in other image information captured by the imaging device if desired.

Figure 5:
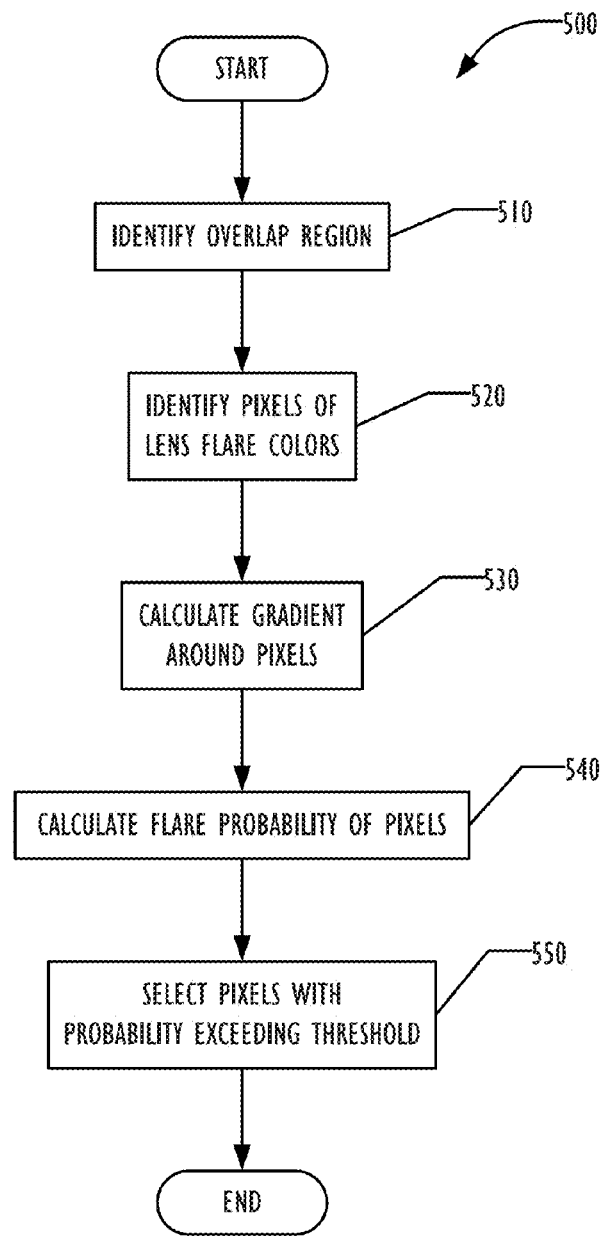
FIG. 5 is a flowchart illustrating a technique for identifying lens flare regions in an individual image.

Alternatively, or in addition to technique 400, a technique 500 illustrated in the flowchart of FIG. 5 may be used to identify lens flare regions in an individual image. Some implementations may use technique 400 first to identify which images in the sequence to consider, then use technique 500 to examine only those images suspected of having lens flare, reducing the computational resources needed. By using both techniques 400 and 500, in addition to reducing computational resources, the combined technique is more robust, reducing false positives in the identification of lens flare regions. Reducing false positives helps maintain image quality, because the lens flare mitigation techniques may produce detrimental effects on the image. However, the lens flare region detection technique 500 may be performed without limiting the images using auto-exposure parameters if desired.

Although the entire image may be analyzed, to reduce computational resources needed typically implementations will first identify an overlap region between successive images in block 510. Lens flare outside of the overlap region, although possibly artistically undesirable, generally does not produce artifacts related to the generation of the panoramic image by stitching successive images together at the overlap region, thus the areas outside of the overlap region may be ignored. However, the techniques described below may be used to reduce lens flare effects in other areas of the image, if desired.

The image areas affected by flare tend to have a specific color which depends on the imaging device, including the lens, used. In addition, such areas typically exhibit a lower contrast. In one implementation, the color locus of lens flare pixels can be determined in a predetermined color space, such as the YUV color space, by analyzing multiple images affected by flare. Thus, in block 520 pixels may be identified as possible lens flare pixels based on their color in a predetermined color space. The gradient magnitude of the intensity plane may be used as a measure of contrast. Based on this information the disclosed techniques may determine the likelihood that any given pixel is affected by lens flare, by analyzing the YUV color components of the pixel (in block 520) and the average gradient magnitude in a small spatial neighborhood around the pixel (in block 530). A lens flare probability can be thereby assigned to every pixel in block 540, based on the calculations of blocks 520 and 530. The lens flare probability may then be used to select pixels with a probability that exceeds a predetermined threshold probability value as lens flare pixels in block 550. Those lens flare pixels may then be considered for mitigation of lens flare effects, as described in more detail below.

Mitigation by Reducing Jaggy Border Artifacts

In general the transition border (seam) between two consecutive images in the panorama is determined by analyzing their overlapping area. The basic idea is to select the seam as a curve that passes through those pixels where the two images are most similar. Since the lens flare manifests differently in consecutive images the lens flare may affect the seam trajectory. Often the result is a jaggy transition border between images, which makes the flare look unnatural in the final panorama (see, for example, FIG. 1). By using the lens flare probability of each pixel, calculated as described above, to guide the seam trajectory, the jaggy border artifacts may be reduced or eliminated. As discussed above, a natural lens flare is expected to look regular, like a straight line in some cases. Based on this observation, these jaggy border artifacts caused by lens flare may be reduced or eliminated by biasing the seam towards a straight line whenever it passes through a pixel that is likely to be a lens flare pixel. An example of the mitigation of lens flare effects produced by this technique is shown in the photograph illustrated in FIG. 2, in which the jaggy border lines 110 of FIG. 1 have been changed into straight lines 210 in FIG. 2.

Figure 6:
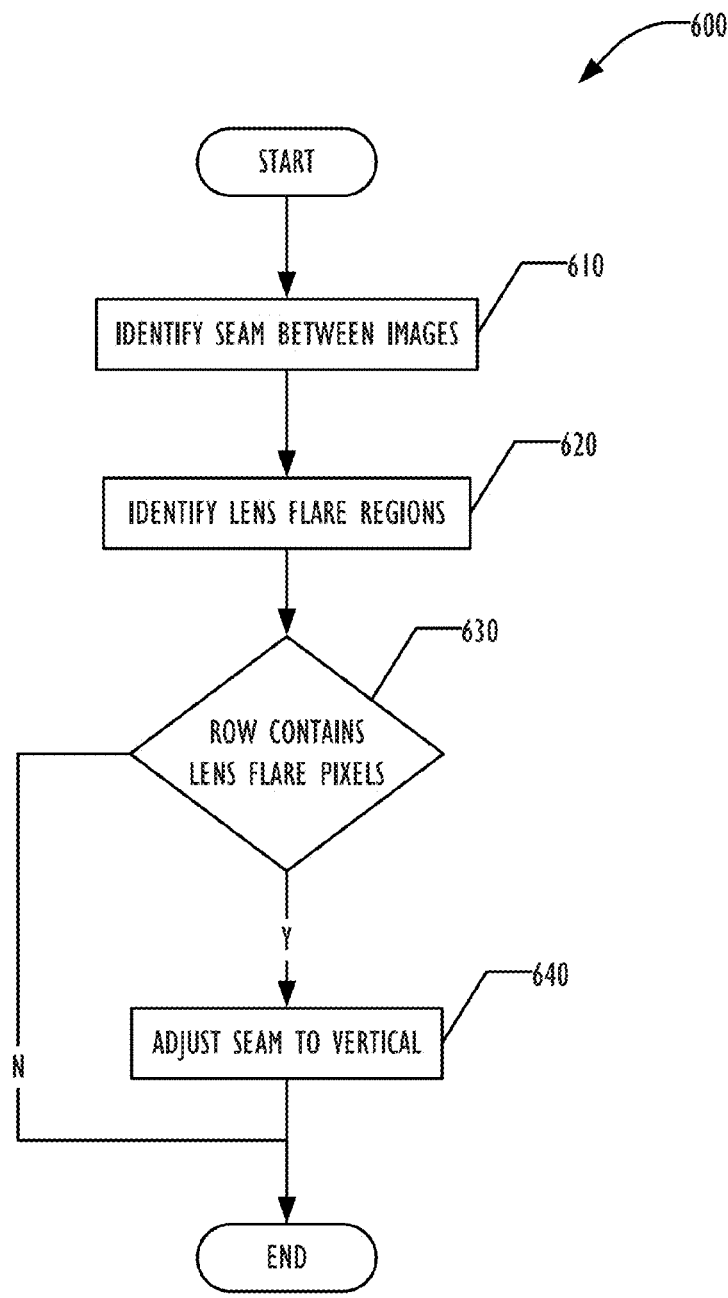
FIG. 6 is a flowchart illustrating a technique for reducing lens flare effects in an image.

FIG. 6 is a flowchart illustrating a technique 600 for biasing the seam toward the vertical. In block 610, a proposed seam is identified, using any desired technique for calculating the position of a seam between two overlapping images. Then in block 620, lens flare regions are identified, using the techniques for lens flare detection described above. For each horizontal row of pixels of the overlap region, in block 630 a determination is made whether the row contains lens flare pixels. If the row does contain lens flare pixels, then in block 640 the seam is adjusted to the vertical across that row of pixels.

In some implementations, the determination of block 630 counts the number of probably lens flare pixels detected as described above, and considers the row to have lens flare pixels if the count exceeds a predetermined threshold number of lens flare pixels.

Figure 1:
FIG. 1 is a photograph illustrating a panoramic photograph with lens flare effects according to the prior art.
Figure 2:
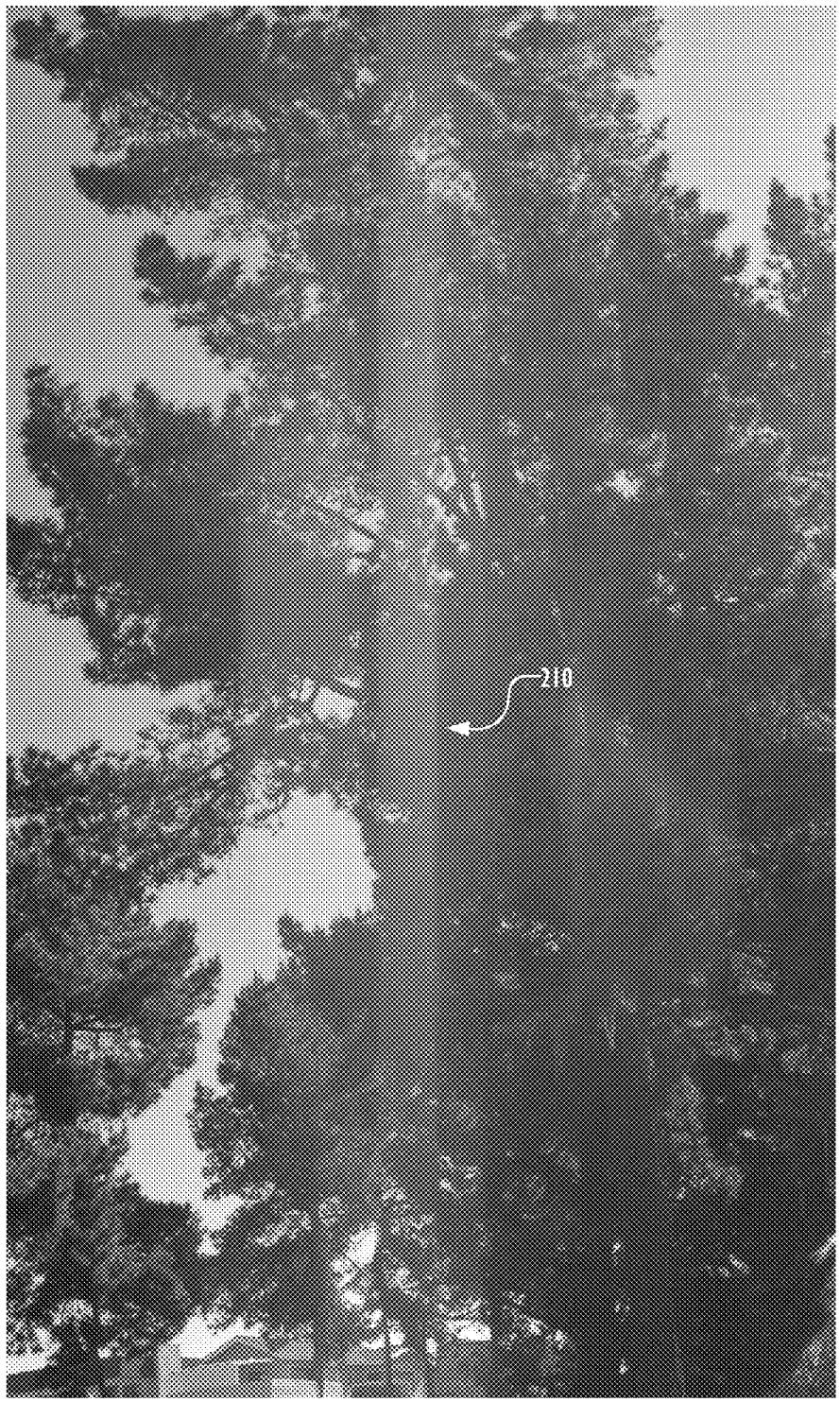
FIG. 2 is a photograph illustrating the panoramic photograph with lens flare mitigation according to one embodiment.

The resultant vertical seam lines may still be somewhat unnatural to a trained eye, but produce a more natural look than the jaggy borders illustrated in the photograph of FIG. 1.

Although as described above, the seam is biased toward the vertical, similar techniques may bias the seam toward the horizontal, by considering columns of pixels instead of rows.

Mitigation by Skipping the Input Images that are Affected by Lens Flare

In addition to or alternatively to the mitigation technique described above, if there is a large overlap between consecutive images of the sequence of images, lens flare effects may be mitigated or potentially eliminated by omitting some input images that are affected by flare. High input frame rates and slow camera motion are both contributing factors that ensure such a large overlap between images. This image omission technique may be combined with the vertical adjustment of the seam to limit the number of images of the sequence in which the seam is adjusted because of lens flare effects, and may reduce the computational resources required to perform the lens flare effect mitigation.

Mitigation by Reducing Lens Flare by Recoloring Lens Flare Pixels

Figure 7:
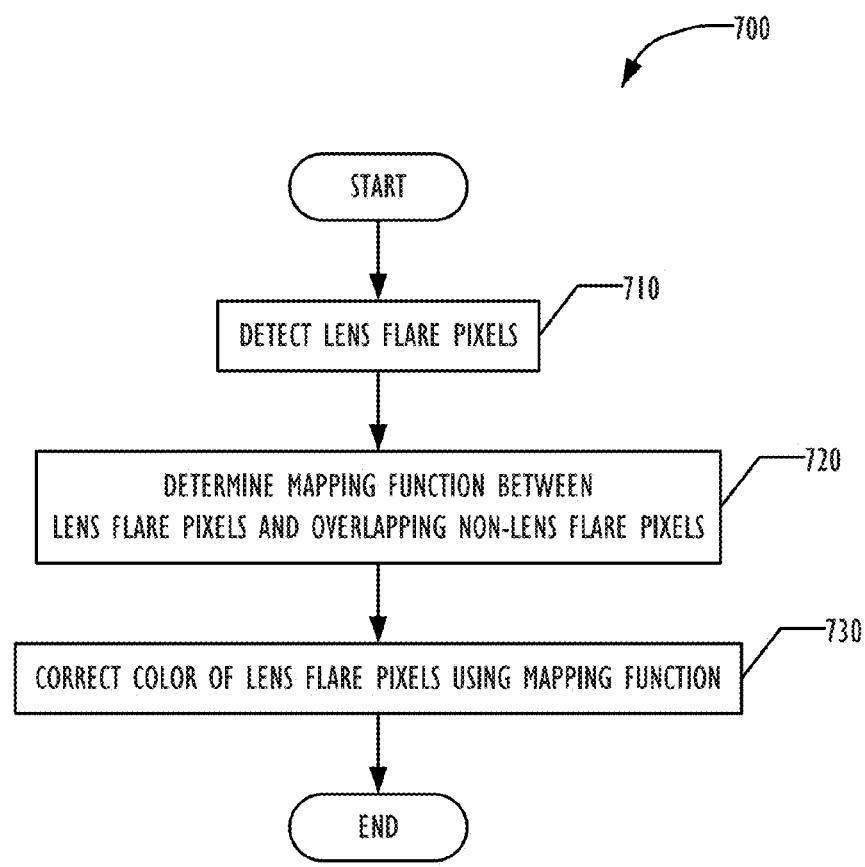
FIG. 7 is a flowchart illustrating another technique for reducing lens flare effects in an image.

Exploiting the fact that lens flare may change from one image to another, lens flare pixels of a successor image may overlap over non-lens flare pixels of the predecessor or successor image. FIG. 7 is a flowchart illustrating a technique 700 for using color mapping to reduce lens flare in the images. In block 710 lens flare pixels are detected using the techniques described above. In block 720 a mapping function is determined that matches the colors of the flare pixels with the colors of their corresponding pixels from the predecessor image or the successor image. In block 730 the color of the pixels with considered likely to be lens flare pixels may be corrected in the current image of the sequence of images, recoloring the pixels by color-mapping in accordance to the mapping functions determined in block 720, reducing the effect of lens flare in the image. Any desired type of color mapping functions may be used. One example of such a color mapping function is a tone-mapping function.

Any or all of the mitigation techniques described above may be used singly or in combination with any other mitigation techniques.

Figure 8:
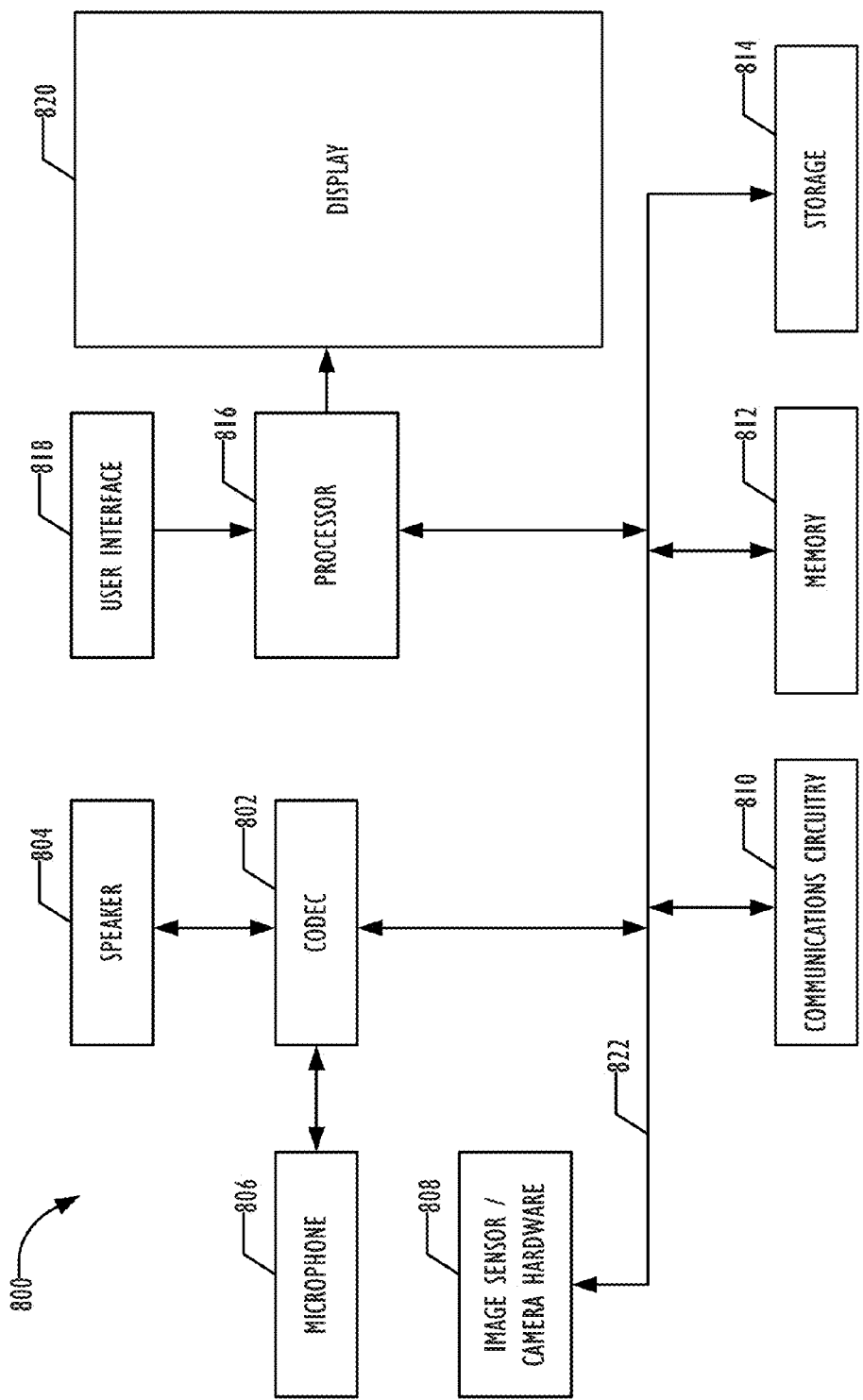
FIG. 8 is a block diagram illustrating a programmable imaging device in which the technique disclosed herein may be implemented.

FIG. 8 is a simplified functional block diagram illustrating a programmable device 800 according to one embodiment that can implement the techniques described above. The programmable device 800 may include a processor 816, display 820, microphone 806, audio/video codecs 802, speaker 804, communications circuitry 810, an image sensor with associated camera hardware 808 for performing image capture, user interface 818, memory 812, storage device 814, and communications bus 822. Processor 816 may be any suitable programmable control device and may control the operation of many functions, such as the generation and/or processing of image data, as well as other functions performed by programmable device 800. Processor 816 may drive display 820 and may receive user inputs from the user interface 818. An embedded processor provides a versatile and robust programmable control device that may be utilized for carrying out the disclosed techniques.

Storage device 814 may store media (e.g., image and video files), software (e.g., for implementing various functions on device 800), preference information, device profile information, and any other suitable data. Storage device 814 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 812 may include one or more different types of memory which may be used for performing device functions. For example, memory 812 may include cache, ROM, and/or RAM. Communications bus 822 may provide a data transfer path for transferring data to, from, or between at least storage device 814, memory 812, and processor 816. Although referred to as a bus, communications bus 822 is not limited to any specific data transfer technology. User interface 818 may allow a user to interact with the programmable device 800. For example, the user interface 818 can take a variety of forms, such as a button, keypad, dial, a click wheel, or a touch screen.

In one embodiment, the programmable device 800 may be a programmable device capable of processing and displaying media, such as image and video files. For example, the programmable device 800 may be a device such as such a mobile phone, personal data assistant (PDA), portable music player, monitor, television, laptop, desktop, and tablet computer, or other suitable personal device.

Figure 9:
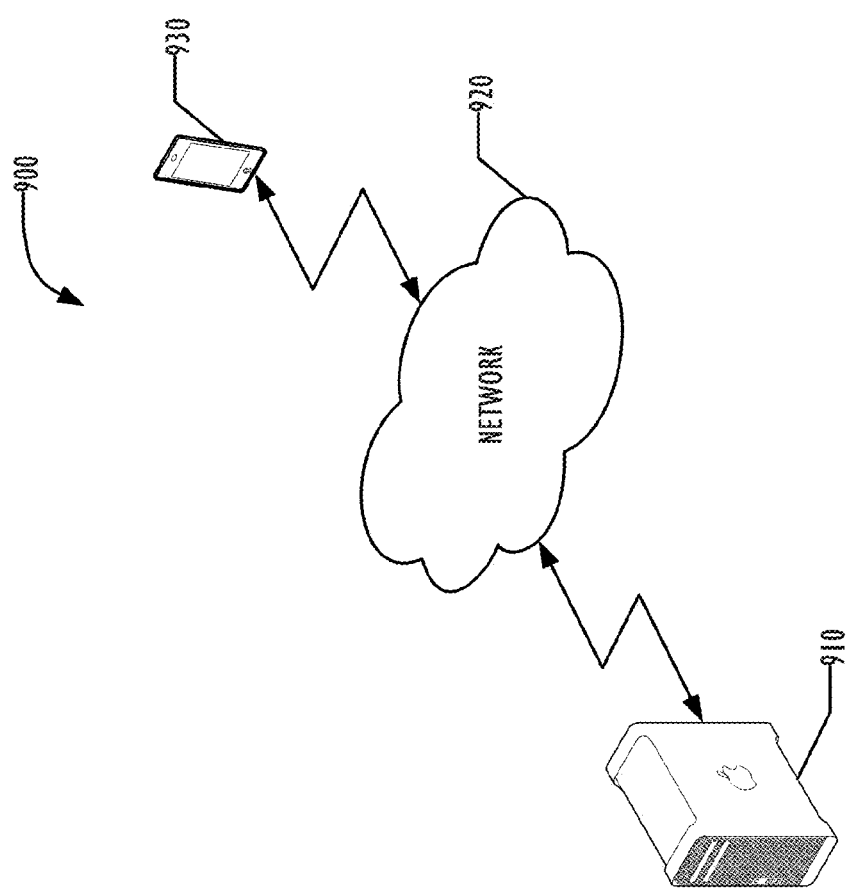
FIG. 9 is a block diagram illustrating a network of programmable devices in which the technique disclosed herein may be implemented.

In addition, although the typical implementation is configured to capture the sequence of images for stitching into a panoramic image and to generate the panoramic image on the same device, the processing may be separated as desired. For example, FIG. 9 illustrates a system 900 in which a mobile device 930 such as a smart phone captures the sequence of panoramic image frames, but instead of generating the panoramic image on the mobile device 930, the sequence of panoramic image frames (or the sequence of slices extracted from those frames) is transmitted to a desktop computer 910 via one or more connecting networks 920. The desktop computer 910 may then use the techniques described above to process the sequence of slices and generate a panoramic image.

Although the description above has been written in terms of panoramic images, the lens flare detection and mitigation techniques are not limited to panoramic images, but may be used in other types of imaging in which multiple images are stitched together to form a composite image, including high dynamic range images.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device, readable by a programmable control device, comprising instructions stored thereon for causing the programmable control device to:
   capture a sequence of images with a programmable imaging device; and
   reduce lens flare effects in the sequence of images, wherein the instruction to reduce lens flare effect further comprise instructions to cause the programmable control device to:
      identify an overlap region between successive images of the sequence of images;
      detect lens flare regions in the overlap region;
      omit an image containing a lens flare region in the overlap region in response to the detecting of the lens flare regions in the overlap region; and
      reduce lens flare effects in the overlap region.

2. The non-transitory program storage device of claim 1, wherein the instructions stored thereon further comprise instruction for causing the programmable control device to:
   generate a panoramic image from the sequence of images.

3. The non-transitory program storage device of claim 1, wherein the instructions for causing the programmable control device to detect lens flare regions in the overlap region comprise instructions for causing the programmable control device to:
   determine a color locus of lens flare regions in a predetermined color space; and
   calculate an average intensity gradient magnitude in a spatial region surrounding a pixel of an image of the sequence of images corresponding to the color locus.

4. The non-transitory program storage device of claim 1, wherein the instructions for causing the programmable control device to detect lens flare regions in the overlap region further comprise instructions for causing the programmable control device to:
   select pixels with a flare probability that exceeds a predetermined threshold probability value.

5. The non-transitory program storage device of claim 1, wherein the instructions for causing the programmable control device to detect lens flare regions in the overlap region comprise instructions for causing the programmable control device to:
   identify an image of the sequence of images containing lens flare; and
   identify pixels in the image corresponding to lens flare.

6. The non-transitory program storage device of claim 1, wherein the instructions for causing the programmable control device to detect lens flare regions in the overlap region comprise instructions for causing the programmable control device to:
   omit an images containing lens flare regions from the sequence of images.

7. A programmable device, comprising:
   an image sensor;
   a programmable control device; and
   a memory coupled to the programmable control device and the image sensor, wherein instructions are stored in the memory, the instructions causing the programmable control device to:
      capture a sequence of images using the image sensor;
      mitigate lens flare effects in the sequence of images, comprising instructions causing the programmable control device to:
         identify an overlap region between successive images of the sequence of images;
         detect lens flare regions in the overlap region;
         omit an image containing a lens flare region in the overlap region in response to the detecting of lens flare regions in the overlap region; and
         mitigate lens flare effects in the overlap region; and
      generate a panoramic image from the sequence of images.

8. The programmable device of claim 7, wherein the instructions causing the programmable control device to mitigate lens flare effects in the overlap region comprise instructions causing the programmable control device to:
   omit images containing lens flare regions from the sequence of images.

9. The programmable device of claim 7, wherein the instructions causing the programmable control device to mitigate lens flare effects in the overlap region comprise instructions causing the programmable control device to:
   recolor lens flare pixels in the overlap region.

10. The programmable device of claim 9, wherein the instructions causing the programmable control device to recolor lens flare pixels in the overlap region comprise instructions causing the programmable control device to:
    determine a mapping function that matches a color of lens flare pixels with a color of corresponding pixels of a successor or predecessor image of the sequence of images; and
    recolor the lens flare pixels by tone mapping the lens flare pixels based on the mapping function.

11. The programmable device of claim 7, wherein the instructions for causing the programmable control device to detect lens flare regions in the overlap region comprise instructions for causing the programmable control device to:
    calculate an average intensity gradient magnitude in a spatial region surrounding a pixel of an image of the sequence of images having a color corresponding to lens flare regions.

12. The programmable device of claim 7, wherein the instructions for causing the programmable control device to detect lens flare regions in the overlap region further comprise instructions for causing the programmable control device to:
  select pixels with a flare probability that exceeds a predetermined threshold probability value.

13. A method of mitigating lens flare effects in a sequence of images, comprising:
  identifying an overlap region between successive images of the sequence of images;
  detecting a lens flare region in the overlap region;
  omitting an image containing a lens flare region in the overlap region in response to the detecting of lens flare region; and
  reducing lens flare effects in the lens flare region.

14. The method of claim 13, wherein reducing lens flare effects in the lens flare region comprises:
  omitting the image containing the lens flare region from the sequence of images.

15. The method of claim 13, wherein the reducing of lens flare effects in the lens flare region comprises:
  determining a mapping function that matches a color of lens flare pixels with a color of corresponding pixels of a successor or predecessor image of the sequence of images; and
  tone mapping the lens flare pixels based on the mapping function.

16. The method of claim 13, wherein the reducing of lens flare effects in the lens flare region comprises:
  calculating an average intensity gradient magnitude in a spatial region surrounding a pixel of an image of the sequence of images having a color corresponding to lens flare region;
  calculating a probability that the pixel is a lens flare pixel based on the average intensity gradient magnitude; and
  identifying the pixel as a lens flare pixel when the probability that the pixel is a lens flare pixel exceeds a predetermined threshold value.

17. A programmable device, comprising:
  an image sensor;
  a programmable control device; and
  a memory coupled to the programmable control device and the image sensor, wherein instructions are stored in the memory, the instructions causing the programmable control device to:
  capture a sequence of images using the image sensor;
  mitigate lens flare effects in a lens flare region of a first image of the sequence of images overlapped by a second region of a second image of the sequence of images;
  omit an image containing the lens flare region in an overlap region; and
  generate a composite image from at least some of the sequence of images.

* * * * *